No. 802,652. PATENTED OCT. 24, 1905.
T. MILLEN.
DASH ELECTRIC HEADLIGHT.
APPLICATION FILED MAY 15, 1905.
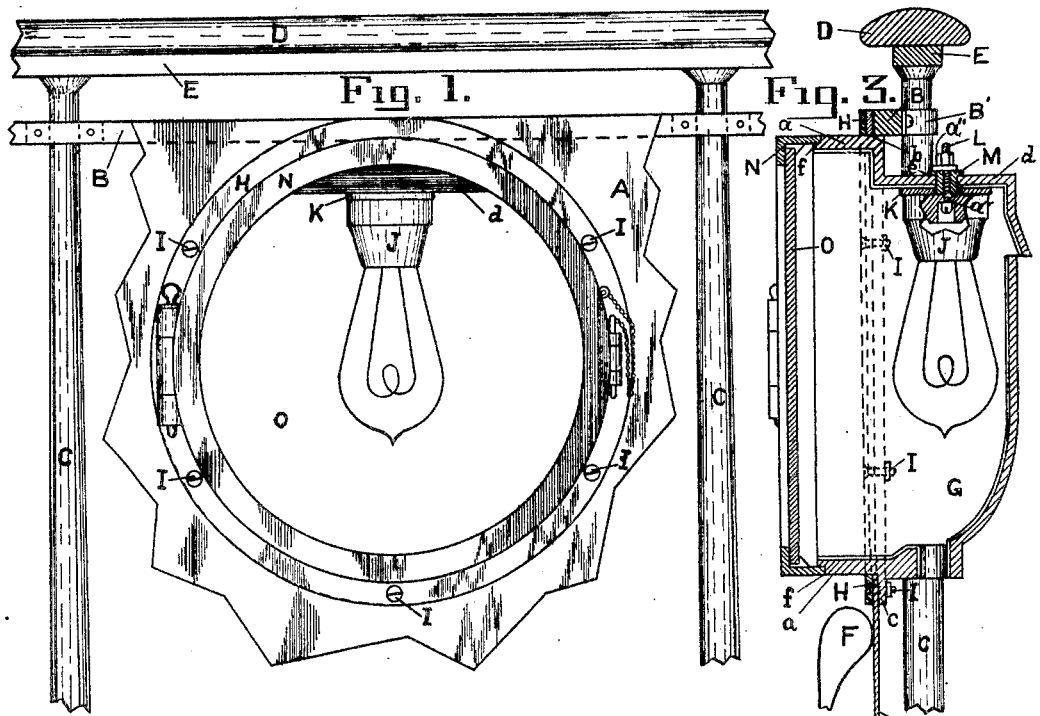
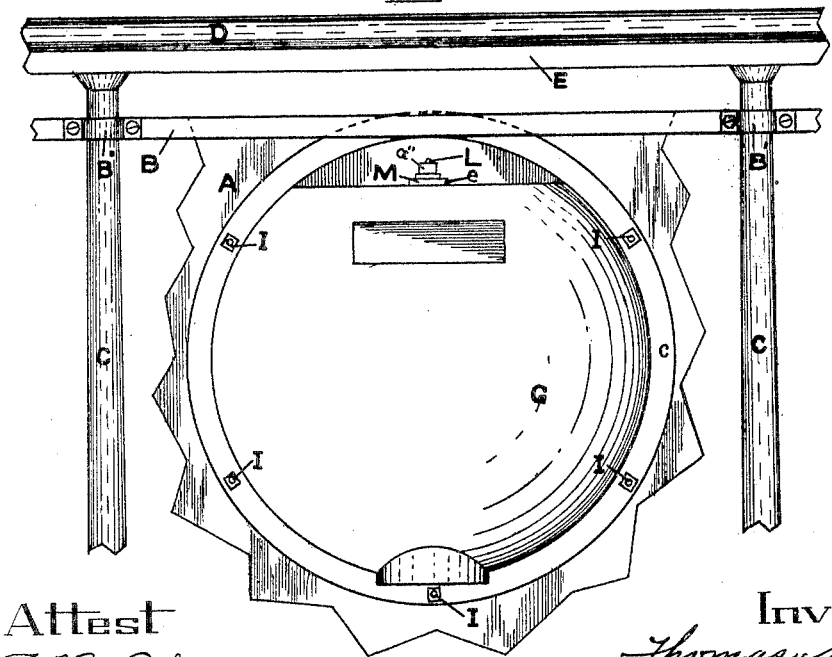
Attest
E. B. Lehman
Frank A. Spangler.
Inventor.
Thomas Millen
By J. Kirby Jr.
His atty.

UNITED STATES PATENT OFFICE.

THOMAS MILLEN, OF NEW YORK, N. Y.

DASH ELECTRIC HEADLIGHT.

No. 802,652. Specification of Letters Patent. Patented Oct. 24, 1905.

Application filed May 15, 1905. Serial No. 260,576.

*To all whom it may concern:*

Be it known that I, THOMAS MILLEN, a citizen of the United States, and a resident of the city of New York, in the county and State of New York, have invented certain new and useful Improvements in Dash Electric Headlights; and I do hereby declare the following to be a full, clear, and exact description of the invention, such as will enable others skilled in the art to which it appertains to make and use the same, reference being had to the accompanying drawings, and to the letters of reference marked thereon, as forming a part of this specification.

My invention relates to dash electric headlights for street-railway cars and similar uses, and has reference more particularly to the type of headlights that are intended to be set in a hole and secured therein to the dashboard.

The invention has for its object to so construct such headlights as to permit of their being set in the dashboard at a higher elevation than is permissible with such headlights as heretofore constructed in order that the safety-fenders when thrown back and out of service may rest against the dashboard and clear the headlight, thus avoiding the use of guards to protect the headlight from breakage or damage thereby. I have found from actual experience in the use of said type of headlights that in many instances the safety-fenders, when certain types are employed, when thrown back and out of service strike the headlight and break the front glass or otherwise damage the headlight, and to prevent the same it is necessary to not only set the headlight to the extreme limit of elevation in the dashboard, but to use a headlight of smaller diameter than is desirable or build the dashboard higher than is desired or would otherwise be required, and which in cars already built would involve great expense and annoyance. Therefore to obviate the above-recited difficulty I have invented a simple and efficient means of elevating the headlight in the dashboard sufficient to accomplish the desired result, in many cases without reducing the size of the headlight or raising the dashboard, the said means being fully hereinafter described, claimed, and illustrated in the accompanying drawings, in which—

Figure 1 represents a front view of a portion of the dashboard and dash-cap of a street-railway car with my improved headlight mounted in the dashboard; Fig. 2, a rear view of the same, and Fig. 3 a vertical section through the center thereof.

Similar letters of reference indicate corresponding parts throughout the drawings.

A represents the dashboard of a street-car; B, a rail to which the top thereof is secured.

C represents standards, a number of which are employed, extending from the floor of the car to a point above the dashboard to support the dash-cap D, which rests upon an iron strip E, the standards being stayed to the rail B by stirrups B' in the usual manner.

F represents a portion of the safety-fender thrown back and at rest against the dashboard.

G is the headlight-case, which is made in the form of a hollow shell with an open front and a horizontally-disposed portion $a$, adapted to be inserted in an opening $b$ in the dashboard. The case is provided with a laterally-projecting flange $c$, which extends around the outer surface thereof to points represented substantially by a line drawn horizontally across the top of the case, thus permitting the latter to be set in the dashboard close up to the under side of the rail B. The case G and flange $c$ are preferably formed of cast metal in a single piece, the said flange bearing against the inner side of the dashboard around the said opening. A dash-collar H surrounds the said portion $a$ of the case and bears against the outer side of the dashboard, the flange $c$ and collar H being provided with a number of holes registering with each other to receive bolts I, which also pass through the dashboard and by which the headlight is firmly secured thereto. It will be observed that by breaking the continuity of the flange $c$, as described, the headlight can be set as much higher in the dashboard as the distance represented by the width of the flange, which ordinarily is about three-quarters of an inch and which in many instances is of great importance. At the top of the case, in the rear of the flange $c$, there is formed a horizontally-flattened surface $d$, to the under side of which is suspended a socket-base J, between which and the wall of the case there may be inserted a washer K of non-conducting material, the said socket-base being held in position by a bolt L, the head of which engages a shoulder $a'$ in the socket-base and which extends therefrom through said washer and through a non-conducting sleeve or bushing M in the top of the case, provided with a shoulder or flange $e$, resting on the top side of the case and against which a nut $a''$, engaging the bolt L, is screwed, thus firmly securing the socket-base J, the washer K, and the bushing M in place. A glass holder N, carrying a glass disk O is hinged to the front rim $a$ of the case and registers with a circumferential recess $f$, as more clearly shown in Fig. 3.

I am aware that it is not new to construct a headlight with a laterally-projecting flange extending entirely around the body of the case thereof for the purpose of securing the headlight to the dashboard of a railway-car—as, for example, is shown in United States Letters Patent No. 573,283—and I do not claim, broadly, such construction.

Having thus described my invention, I claim—

1. The combination with the dashboard of a railway-car, of a rail at the top and on the inside thereof, an opening in the dashboard immediately below said rail, a headlight-case set in the said opening and having a flange projecting laterally from and around the case but terminating at a line drawn horizontally across the top side thereof and registering with the under side of said rail; the said flange having a bearing against the inside of the dashboard around the said opening therein, a collar surrounding the headlight-case on the outside of the dashboard and means for clamping said flange and said collar to the dashboard, substantially as and for the purpose set forth.

2. As a new article of manufacture, a headlight-case comprising a cast metallic shell open at one end and closed at the other and having at said open end a horizontally-disposed portion adapted to be inserted through an opening in the dashboard of a railway-car; a flange cast integral with and projecting laterally from and around the case below a line drawn horizontally across the top side thereof and terminating at said line, and a flattened portion in the top side of the case in the rear of said flange to receive a lamp-socket, substantially as and for the purpose set forth.

In testimony that I claim the foregoing as my own I hereunto sign my name, this 3d day of May, 1905, in the presence of two witnesses.

THOMAS MILLEN.

Witnesses:
GEORGE S. MILLEN,
T. G. RANDALL.